United States Patent [19]

Koltermann et al.

[11] 4,320,806

[45] Mar. 23, 1982

[54] POWER TOOL, IN PARTICULAR A HAND-HELD COMPRESSED AIR SCREW DRIVER

[75] Inventors: Jurgen K. D. Koltermann, Aalen; Dieter W. Stein, Oberkochen; Eugen Mattheiss, Lauchheim; Bernhard J. Polzer, Riesburg, all of Fed. Rep. of Germany

[73] Assignee: Deutsche Gardner-Denver G.m.b.H., Westhausen, Fed. Rep. of Germany

[21] Appl. No.: 31,730

[22] Filed: Apr. 20, 1979

[30] Foreign Application Priority Data

Jun. 28, 1978 [DE] Fed. Rep. of Germany ....... 2828379

[51] Int. Cl.[3] ........................ B23Q 5/06; B25B 23/145

[52] U.S. Cl. .......................................... 173/12; 91/59; 81/470

[58] Field of Search .............................. 173/12; 91/59; 192/0.034, 150; 81/470

[56] References Cited

U.S. PATENT DOCUMENTS

| | | | |
|---|---|---|---|
| 3,387,669 | 6/1968 | Wise, Jr. et al. | 192/150 X |
| 3,406,762 | 10/1968 | Kramer | 91/59 X |
| 3,512,590 | 5/1970 | Tibbott | 173/12 |
| 3,616,864 | 11/1971 | Sorensen et al. | 173/12 |
| 4,078,618 | 3/1978 | Depagter et al. | 173/12 |
| 4,191,282 | 3/1980 | Schoeps | 192/150 X |
| 4,223,745 | 9/1980 | Workman, Jr. | 173/12 |

FOREIGN PATENT DOCUMENTS

| | | | |
|---|---|---|---|
| 655495 | 1/1963 | Canada | 192/0.034 |
| 2617610 | 11/1976 | Fed. Rep. of Germany | 81/52.4 A |

*Primary Examiner*—Robert Mackey

*Attorney, Agent, or Firm*—Michael E. Martin

[57] ABSTRACT

A pneumatic screwdriver or nutsetter includes a manually actuated electrical switch and a solenoid operated motive air shutoff valve which includes a spring biased reset element for moving the shutoff valve closure element from a valve closed position to a valve open position prior to introduction of compressed air to the tool motor. The reset element is retracted away from the closure element by pressure air on startup of a tool operating cycle. The closure element is released upon deenergization of the solenoid at a predetermined signal to close the shutoff valve. In an alternate embodiment the switch is replaced by a pneumatic valve and the reset element is pressure air biased to move the shutoff element from the shutoff valve closed position to the open position.

10 Claims, 12 Drawing Figures

POWER TOOL, IN PARTICULAR A HAND-HELD COMPRESSED AIR SCREW DRIVER

BACKGROUND OF THE INVENTION

This invention concerns a power tool, in particular a hand-held compressed air screwdriver with a compressed air motor, a switch which controls the compressed air supply, and a shutoff valve arranged between the switch in the compressed air supply passage to the motor.

In a known tool of this kind as disclosed in German Opened Specification No. DT-OS 24 23 300, a switch and a shutoff valve are provided wherein a servo valve is connected in series to the shutoff valve and disconnects the shutoff valve by means of a circuit breaking air impulse. This indirect disconnection of the shutoff valve results in a delay in the motor disconnection with all the disadvantages relative to the accuracy of the torque value to be applied to the fastener.

According to this invention, however, a tool of the general type mentioned is provided whereby upon reaching a predetermined torque limit an immediate cutoff of compressed air to the motor is possible which produces high accuracy in adhering to the predetermined torque limit.

According to the invention, this can be achieved in a tool of the type mentioned at the beginning wherein the shutoff valve comprises two coaxial parts which are axially movable independent of one another. One part forms a reset element and the other part forms a shutoff element. The valve elements are held in a starting position by flexible support of the reset element while the compressed air supply is shut off by means of a separate shutoff valve or switch. Upon introduction of the compressed air supply by means of the switch and simultaneous locking of the shutoff element in an open position, which may be the same as its starting position, the reset element is movable away from the shutoff element into a position whereby the fluid shutoff or closed position is achieved, at a predetermined torque or angle of rotation, by releasing the shutoff element and moving the same in the direction of the compressed air flow. The shutoff element may then be moved automatically by means of the reset element back to its starting position from its closed position after shutoff of the compressed air supply by means of the switch.

The development according to the invention makes possible with only one valve, the shutoff valve, the direct control of the compressed air supply to the motor with a particularly high accuracy so that upon reaching the torque limit, motor shutoff is immediately effected. The accuracy of torque control with the tool design according to the invention is also particularly high because the shutoff element is moved into its closed position in the direction of the compressed air flow so that the compressed air flow pushes the shutoff valve into this position. By proper selection of the cross-section area of the upstream and the downstream sides of the shutoff element a pressure difference results which also contributes to a rapid movement of the shutoff element upon release of the locking means.

According to the present invention, the closing speed of the shutoff valve can be increased still more if the shutoff element is elastically biased in the closing direction, that is toward the reset element, which bias produces a high initial acceleration of the shutoff element. In this regard, the shutoff element is also formed preferably by a valve disk of small dimensions. An actuating rod can be associated with the shutoff element which is mechanically or magnetically lockable and wherein magnetic locking can be achieved in simple ways by means of a solenoid or magnetic coil. Mechanical locking can take place by means of an actuating rod which reacts, for example, with a torque coupling which releases the rod after reaching a predetermined torque limit.

The flexible support of the reset element can be provided by a spring or by pressure fluid from the compressed air supply. In regard to the reset element, a cylindrical piston is found to be a suitable embodiment. Moreover, the valve disk may include a resilient ring seal to provide a tight seal at shutoff while the function of the valve disk is, primarily, to guarantee the fastest possible closing upon urging by the compressed air flow after release of the locking means.

Locking of the shutoff element by means of a solenoid is also provided for by the invention. The solenoid may be energized by operation of a miniature switch which includes an actuating member having a resilient switch engaging element. Such a switch actuator enchances the protection of the sensitive miniature switch against excessive loading and comprises an important element of the invention especially for applications in hand-held compressed air screwdrivers since damage to the miniature switch can thus be decreased even with rugged daily use. In a preferred embodiment of the switch, the actuating member engages the miniature switch by means of a spring which is arranged in a hollow shaft portion of the actuating member. The actuating member is supported in the tool housing by means of another spring which urges the actuating member into its starting position. The actuating member reset spring has a smaller deflection range and greater stiffness than the spring engaged with the miniature switch so in this way any overloading of the miniature switch is impossible since, by means of the reset spring, a blocking of the operation path of the actuating member is achievable before the operational spring for the miniature switch goes to the solid condition. The use of an electrical switch makes possible within the limits of the invention not only the immediate actuating of the solenoid for locking the shutoff element but also additional arrangements, particularly the opening of a master intake valve for the pressure fluid and elimination of electronic devices such as are provided for torque and rotational angle measurements.

The present invention still further contemplates that the switch can comprise a second shutoff valve for directly controlling the compressed air supply to the first mentioned shutoff valve. A second shutoff valve according to the present invention may also make possible in its closed position venting at least of the valve chamber of the first shutoff valve so that the shutoff element can be pushed back due to the resilient support of the reset element from its closed position into the starting position.

In yet another refinement of the present invention, the second shutoff valve can also be arranged in such a way that by means of this valve, which turns on the compressed air supply directly to the first shutoff valve disposed downstream, a pressure fluid signal can be conducted to actuate the reset element to move together with the shutoff element of the first shutoff valve back into the starting position of the first shutoff valve.

Further details of the invention are disclosed in the drawings, the detailed description, and the claims.

Figures 1, 2, 5:
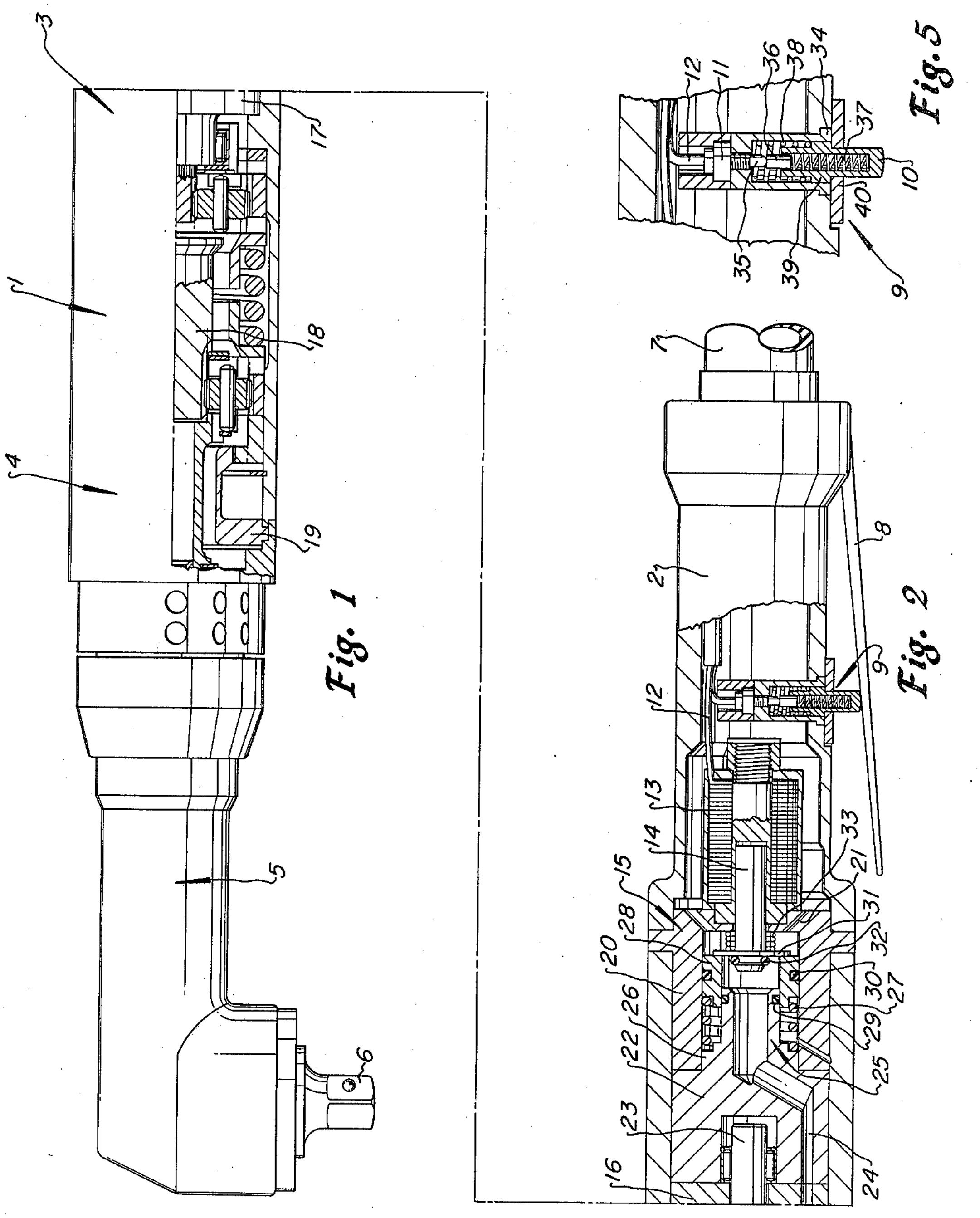
FIGS. 1 and 2 are complementary component drawings of a hand-held power tool formed as a compressed air screwdriver, shown partially in section, wherein the switch is in its open position and the shutoff valve is in the starting position.
FIG. 5 is an enlarged section of the switch in its open position.

The hand-held power tool shown in FIGS. 1 and 2, which comprises a compressed air screwdriver, is generally designated with the numeral 1 and has, in addition to a handle 2, a motor portion 3 including the compressed air motor which is only partially shown here, a reduction gear portion 4, and a final drive portion 5 formed as angular drive which rotatably supports a square end drive shaft 6. The motor portion 3 and gear portion 4 are disposed coaxially one behind the other on one side of handle 2. Compressed air is supplied to the opposite end of handle 2 by a conduit 7.

The handle 2 pivotally supports a control lever 8 which actuates a switch 9 arranged on the handle. The switch 9 comprises, as shown in FIGS. 5 and 6, an actuating member 10 engaged with the control lever 8 and a miniature switch 11 which is connected by means of electric cable 12 with a control-switch box, not shown.

Within the hollow handle 2 there is disposed also a solenoid 13 which likewise is connected to the control-switch box, not shown, and whose armature, running in the axial direction of the tool, is formed by a guide rod 14 which acts together with the shutoff element of a shutoff valve generally designed by numeral 15. Before going into more detail on the construction of the shutoff valve 15, it should be noted that the compressed air motor is disposed axially adjacent to the shutoff valve as indicated by the rear rotor cover 16 and the forward rotor cover 17. The motor is drivably connected to a reduction gear unit 18 which is connected to a torque coupling 19. The torque coupling 19, which may be one of several known types, or alternatively a rotary angle measuring device (not shown) is operable at a predetermined torque exerted on the screw to be tightened, to provide a suitable signal to the aforementioned control-switch box, not shown.

The shutoff valve 15 extends into a member 20 which is cup-shaped and the bottom of which includes opening 21 for the compressed air supply as well as an opening for the guide rod 14 which extends into the solenoid 13. An intermediate member 22 is attached to the member 20 and supports a bearing for the shaft 23 of the compressed air motor rotor. The member 22 includes supply canal 24, leading to the compressed air motor, and an axially projecting portion 25 extending into the member 20. The member 20 and intermediate member 22 are centered with respect to each other by a flange 26. The flange 26 forms at the same time a support shoulder for a spring 27 which surrounds the portion 25 with a clearance on which the reset element of the shutoff valve 15, comprising an annular piston 28, is carried and is movable axially. The piston 28 is closely fitted between the portion 25 and the interior wall of the member 20 and includes packings 29 and 30. By means of the spring 27, the piston 28 is biased toward the bottom of the cup-shaped member 20 and engages in the starting position shown in FIG. 1, a valve plate 31 which, together with a ring seal 32 provided in the extension of the guide rod 14, forms the shutoff element. The valve plate 31 is arranged in the flow path for the compressed air supply to the motor and is biased in the direction of motive air flow by a spring 33.

Figure 6:
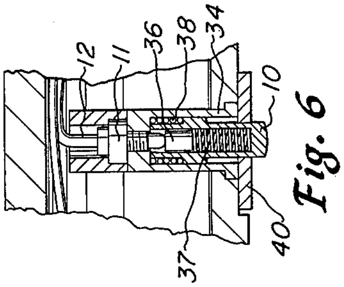
FIG. 6 is a drawing of the switch corresponding to FIG. 5 only in the closed position.
Figure 3:
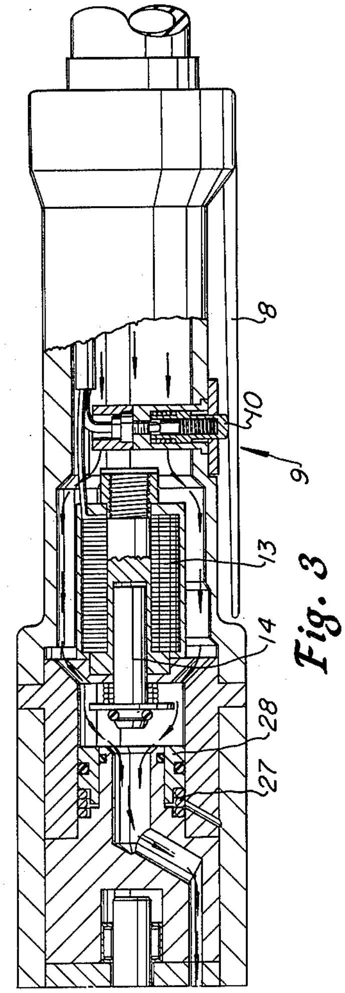
FIG. 3 is an illustration corresponding to the view according to FIG. 2 wherein the switch is shown in its closed position and the shutoff valve is in its open position.
Figure 4:
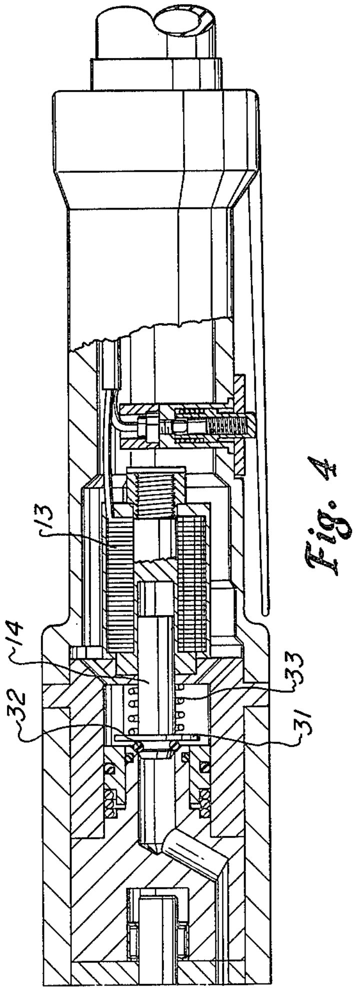
FIG. 4 is a view corresponding to FIG. 2 wherein the switch is in its closed position and the shutoff valve is in its closed position.

Before going into detail about the function and the various positions of the shutoff valve shown in FIGS. 2 to 4, the switch 9, illustrated in detail in FIGS. 5 and 6, shall be further explained. The switch 9 comprises, as already mentioned, a miniature switch 11 which is operable by means of the actuating member 10 which is disposed in a housing 34. The housing 34 also supports the miniature switch 11, whose actuating pin 35 is engaged with a pin 36 which extends into the hollow actuating member 10 and is biased by a spring 37. In conforming to its starting position, the actuating member 10 is biased to the position shown in FIG. 5 by a return spring 38 which surrounds the outside of the actuating member and engages a flange 39 as well as the floor of housing 34. Flange 39 serves simultaneously also as a stop opposite a stop plate 40 by means of which the switch can be fastened in the handle in a way not shown here in detail. The spring 37 in the illustrated design according to the invention is weaker than the reset spring and in addition also has a longer deflection length compared to the reset spring so that by determining the spring characteristics of spring 37, to correspond to that required to actuate the switch 11, the switch is loaded independently of the actual external force which is exerted on the actuating member 10. Accordingly, damage to the switch assembly and particularly to the miniature switch 11 due to improper handling, for example, is largely out of the question.

In the operation of the embodiment of FIGS. 2 through 4, referring to FIG. 2, the switch 9 is in the open position and both movable elements 28 and 31, 32 of the shutoff valve 15 are in their starting positions in which the reset element is engaged with the valve plate 31. The guide rod 14 is disposed in the coil of the solenoid 13 which is not excited so that an unrestrained mobility is given to the guide rod and both elements 28 and 31,32 lie elastically supported against each other. Switch 9, as illustrated in FIG. 3, is actuated by means of lever 8 into its closed position so a corresponding impulse is generated to the switch box which may cause various other signals. Thus, first the compressed air supply is turned on in a way not shown here so that there results a connection of the tool 1 to the compressed air source. Moreover, the solenoid 13 is energized and thereby the guide rod 14 of the shutoff element 31, 32 if fixed in the position shown in FIG. 3. In addition, compressed air acts on the reset element 28 and moves the reset element against the bias of spring 27 so that between valve plate 31 and the reset element there results an annular clearance through which the compressed air can flow through the supply canal 24 to the compressed air motor.

With the closing of switch 9 a measuring network, formed by seveal coupled electronic devices and error detectors, may be energized so that after closing switch 9, and starting of the compressed air screwdriver an exact torque and/or rotary angle measurement is possible.

The tightening process is stopped after reaching a limit signal sensed by the aforementioned electronics for the tightening torque and/or tightening rotary angle. A signal is then conducted from the control-switch box which deenergizes the solenoid coil whereupon the guide rod 14 and the shutoff element become freely movable. Because of its position in the compressed air flow path and because of the bias given here to the shutoff element 31, 32 toward the reset element 28, the shutoff element 31, 32 is displaced suddenly into its closed position shown in FIG. 4 in which the compressed air supply to the motor is interrupted. Because of the bias force applied by the spring 33 against the shutoff element 31, 32, any residual magnetic force of the solenoid coil, which could interfere with the closing process, is easily overcome.

When the shutoff position illustrated in FIG. 4 is attained, the fastener tightening process is interrupted independent of the position of switch 9 which normally is then released. The switch is reset by means of return spring 38 into its open position wherein due to a corresponding signal from the miniature switch the compressed air supply to the tool 1 is interrupted.

The pressure prevailing in the shutoff valve drops together with the interruption of the compressed air supply and now the reset element 28 can be moved back into its starting position, according to FIG. 2, by means of spring 27 wherein simultaneously also the shutoff element is moved into the starting position. Therewith the tool 1 is again ready for the next operating cycle.

Figure 7:
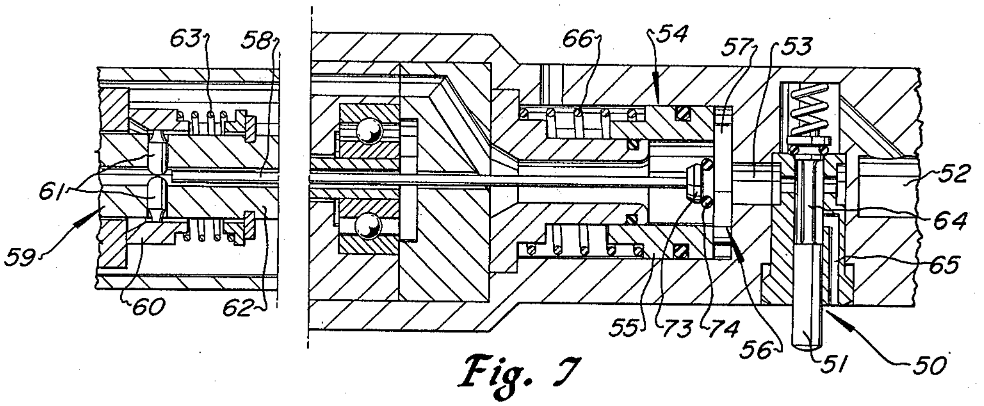
FIGS. 7 through 9 illustrate reduced sections corresponding essentially to FIGS. 2 through 4 wherein a pneumatic-mechanical switch or second shutoff valve is provided in place of the electrical switch and wherein various positions of the second shutoff valve are associated with various positions of the first shutoff valve; and, FIGS. 10 through 12 show a further variation of the switch and shutoff valve according to the invention wherein respective switch positions corresponding to FIGS. 2 through 4 are provided.
Figure 8:
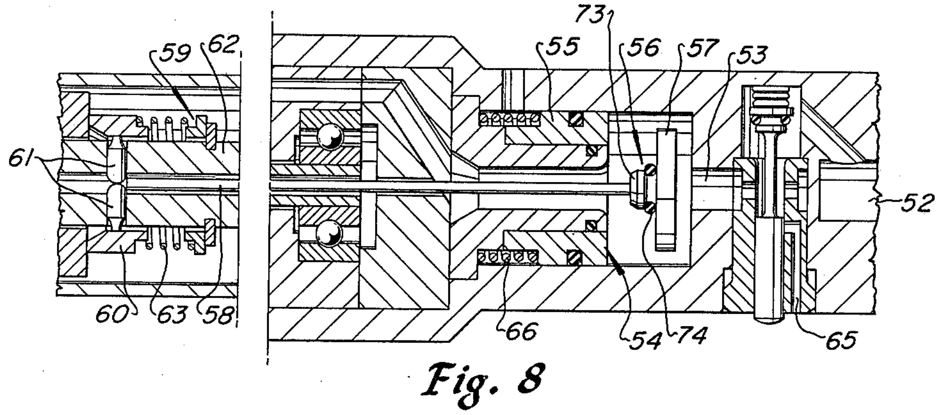
Figure 9:
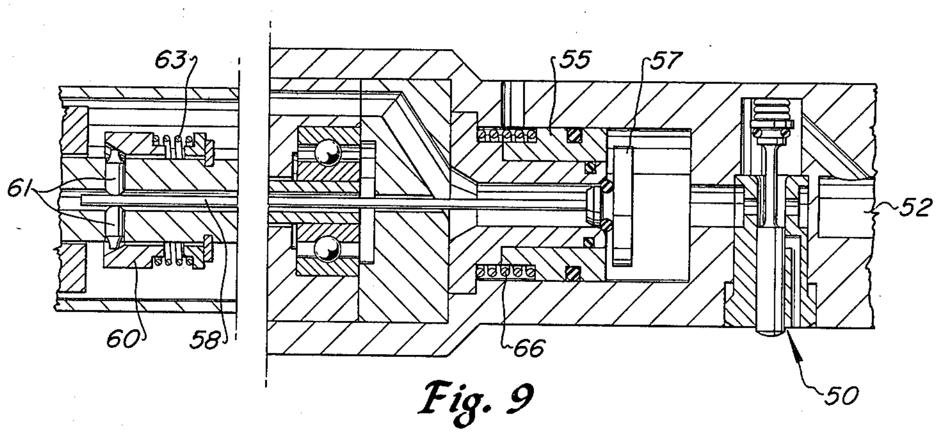

In the embodiment according to FIGS. 7 through 9, fundamentally the same operation is involved; however, here the compessed air supply to the shutoff valve is directly released by means of a switch 50. An actuating member 51 of the switch is formed in part as a valve body which in its open position (FIG. 8) opens the air path between a supply passage 52 lying upstream of switch 50 and a compressed air passage 53 which is arranged to discharge compressed air on a shutoff valve disposed downstream of the switch.

The shutoff valve, which is designated with numeral 54, is built similarly as in the previous discussed embodiment in principal and comprises a reset element 55 formed as an annular piston and a shutoff element 56 which consists of the valve plate 57, a tapered attachment 73 with a seal 74 and an actuating rod 58. The actuating rod 58 extends axially up to a locking device 59 which operates torque dependently in the embodiment shown. The locking device 59 is, in principal, formed as a torque coupling generally known in the way it operates. By way of example the locking device may be similar to the types disclosed in U.S. Pat. Nos. 3,616,864 and 4,078,618. After transmission of a certain torque an axial shifting of a control part 60 takes place. The part 60 is formed as an annular body surrounding a hollow shaft 62 having an axial bore in which the adjusting rod 58 is disposed. As long as a predetermined torque limit is not imposed on the locking device 59 the rod 58 is prevented from moving axially to the left, viewing FIGS. 7 and 8, by radially projecting pins 61. Since the control pins 61 are rounded in the region opening into the axial bore of the shaft 62, there results, by means of the adjusting rod with axial biasing of the same, a radial outward bias against the control pins 61 which remains without effect so long as the control pins 61 are surrounded radially outside by the body 60. As the predetermined torque limit is reached, the body 60 is moved axially against the biasing force of spring 63 and the control pins 61 are forced outwardly in a conically expanded end region of the body 60 and far enough so that adjusting rod 58 is movable axially to the position shown in FIG. 9 and corresponding to the shutoff position of shutoff valve 54.

When the sutoff valve 54 is closed, the motor stops and the tool operator will normally release switch 50 with the result that, as evident from FIG. 7, by means of the reduced diameter shaft member 64 of actuating member 51, a connection between the passage 53 and passage 65 is established which causes venting of the shutoff valve chamber. As a result of this venting and by means of spring 66 the piston 55 together with the valve plate 57 is moved back to the starting position shown in FIG. 7 wherein naturally the adjusting rod 58 will also be drawn back at the same time. As soon as the adjusting rod 58 slips out between the control pins 61, the pins will, due to the conical surface on the body 60, move radially into their inward position under the bias of spring 63. Contrary to the embodiment illustrated in FIGS. 1 through 3, locking of the shutoff element when compressed air is supplied thereto does not directly take place in the position corresponding to the starting position, but slightly displaced from this position, as shown in FIG. 8, wherein the valve plate 57 is arranged so that it lies in the compressed air flow and is subjected to the action of the flow pressure.

Figure 10:
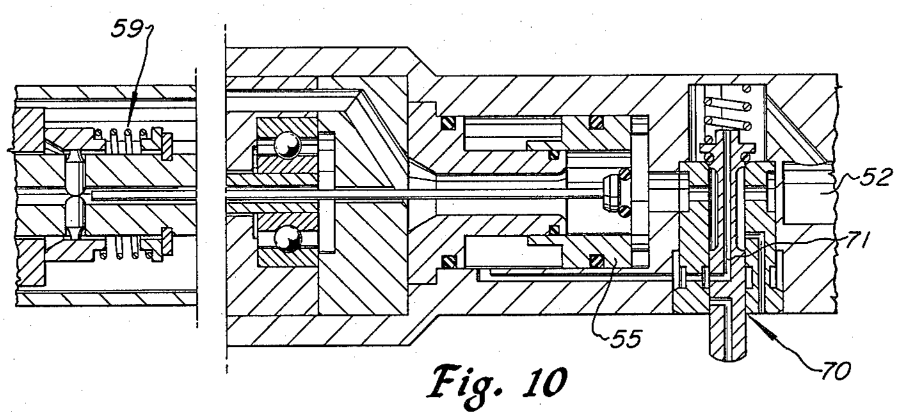
Figure 11:
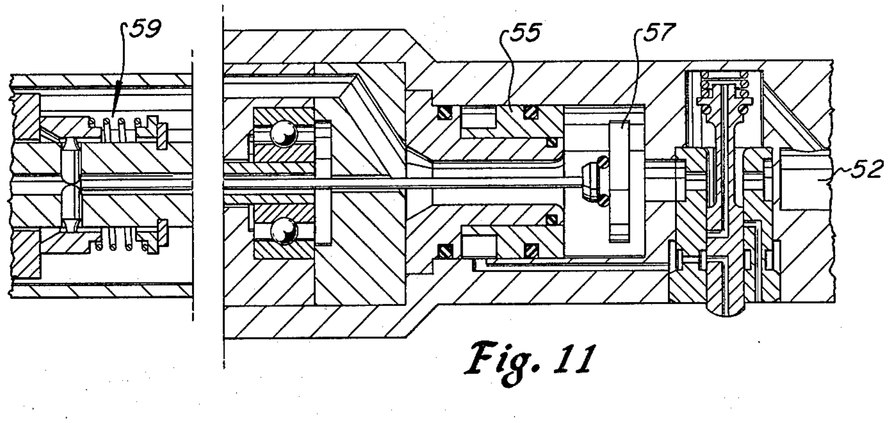
Figure 12:
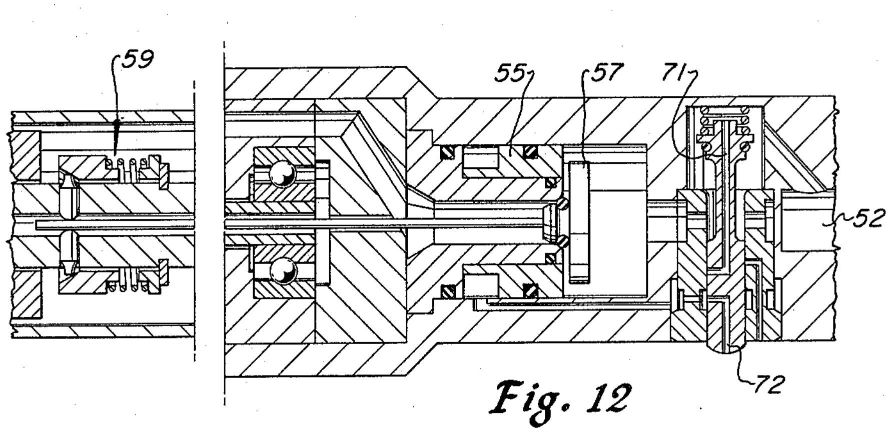

The embodiment according to FIGS. 10 through 12 corresponds substantially to the one according to FIGS. 7 through 9. However, in the embodiment shown in FIGS. 10 through 12 the piston 55, provided as the reset element, is biased in the direction toward its starting position not by a spring but by pressure air. The switch or shutoff valve, designated with numeral 70, is in principal of similar construction with respect to the switch 50 and is provided with an additional passage 71 which, in the closed position of switch, FIG. 10, establishes a connection to compressed air supply passage 52 so that the piston 55 is biased into the position shown in FIG. 10. FIGS. 11 and 12 show that in the open position of switch 70, the connection of the chamber behind the piston 55 to the compresed air supply is interrupted and the chamber is now emptied by means of another passage 72 provided in the actuating member. Accordingly, pressure air acting on the piston side adjacent to the valve plate 57, as in the previous design, will move the piston to the position shown in FIG. 11 so that an open connection to the compressed air motor results. The other details of the embodiment of FIGS. 10 through 12 correspond to those explained in regard to the embodiment of FIGS. 7 through 9.

Also, with the pneumatic-mechanical embodiments according to FIGS. 7 through 12, very high closing speeds for the shutoff valve 54 can be achieved which yield the cited advantages.

What we claim is:

1. In a power tool:
a housing;
a compressed air motor disposed in said housing;
passage means in said housing for conducting compressed air to said motor:
a supply valve for controlling the compressed air supply to said motor, and for venting a portion of said passage means in a closed position of said supply valve;
a shutoff valve disposed in said passage means ahead of a compressed air inlet to said motor, said shutoff valve comprising at least two elements which are arranged coaxially with respect to each other and are movable axially independent of each other; one of said elements comprising a reset element and another of said elements comprising a shutoff element, and a valve seat disposed coaxially with respect to said elements in a fixed position in said housing and engageable by said shutoff element in response to movement of said shutoff element in the direction of compressed air flow in said passage means;
biasing means for holding said elements in a starting position while the compressed air supply is shut off by said supply valve; and,
means for holding said shutoff element in a valve open position associated with the starting position and for releasing said shutoff element at a predetermined torque applied to said holding means whereby said shutoff element is operable to move in the direction of compressed air flow in said passage means to engage said seat to shut off compressed air flow to said motor;
said reset element comprising piston means operable upon introduction of compressed air to said passage means due to actuation of said supply valve to move away from said shutoff element to a position to permit movement of said shutoff element to engage said valve seat; and,
said reset element is operable upon movement of said supply valve to cutoff said compressed air supply to said passage means and vent said portion of said passage means between said supply valve and said rest element to engage said shutoff element to reset said shutoff element to said starting position.

2. A power tool according to claim 1 wherein:
said shutoff element is biased toward said reset element by compressed air in said passage means.

3. A power tool according to claim 1 wherein:
said shutoff element is mechanically locked in said open position by said holding means.

4. A power tool according to claim 3 together with:
an actuating rod engaged with said shutoff element and with a releasable lock associated with said holding means.

5. A power tool according to claim 4 wherein:
said holding means includes means operable to release said lock to release said actuating rod at a predetermined torque exerted on said holding means.

6. A power tool according to claim 1 wherein:
said reset element is elastically biased toward said shutoff element in a direction opposite to flow of compressed air in said passage means.

7. A power tool according to claim 6 wherein:
said reset element comprises a fluid actuated piston.

8. A power tool according to claim 6 wherein:
said reset element including pressure surface means responsive to a fluid pressure force from said compressed air supply to urge said elements toward said starting position.

9. A power tool according to claim 8 wherein:
said supply valve is operable in a first position to shutoff compressed air to said motor and supply compressed air to said pressure surface means on said reset element and, upon actuation of said supply valve to supply compressed air to said motor said supply value is operable to reduce the pressure force acting on said pressure surface means of said reset element.

10. In a power tool:
a housing;
a compressed air motor disposed in said housing;
passage means in said housing for conducting compressed air to said motor;
a switch for controlling the compressed air supply to said motor;
a shutoff valve disposed in said passage means ahead of a compressed air inlet to said motor, said shutoff valve comprising at least two elements which are arranged coaxially with respect to each other and are movable axially independent of each other; one of said elements comprising a reset element and another of said elements comprising a shutoff element, and a valve seat disposed in a fixed position in said housing and engageable with said shutoff element in response to movement of said shutoff element in the direction of compressed air flow in said passage means;
biasing means for holding said elements in a starting position while the compressed air supply is shut off by said switch; and,
means for holding said shutoff element in a valve open position associated with the starting position and for releasing said shutoff element at a pedetermined torque applied to said holding means whereby said shutoff element is operable to move in the direction of compressed air flow in said passage means to shut off compressed air flow to said motor;
said reset element comprising piston means operable upon introduction of compressed air to said passage means due to actuation of said switch to move away from said shutoff element to a position to permit movement of said shutoff element to engage said valve seat;
said reset element being operable upon cutoff of said compressed air supply to said passage means to engage said shutoff element to reset said shutoff element to said starting position; and
said shutoff element comprises a valve disk having a ring seal disposed thereon, said shutoff element being connected to an actuating rod mounted in said housing and engaged with said holding means.

* * * * *